(12) United States Patent
Chou et al.

(10) Patent No.: US 10,826,347 B2
(45) Date of Patent: Nov. 3, 2020

(54) MOTOR SLEEVE AND MOTOR DEVICE

(71) Applicant: CHICONY POWER TECHNOLOGY CO., LTD., New Taipei (TW)

(72) Inventors: Chen-Shi Chou, New Taipei (TW); Zong-Lin Li, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 107 days.

(21) Appl. No.: 16/103,221

(22) Filed: Aug. 14, 2018

(65) Prior Publication Data

US 2019/0393758 A1 Dec. 26, 2019

(30) Foreign Application Priority Data

Jun. 22, 2018 (TW) .............................. 107121568 A

(51) Int. Cl.
*H02K 5/18* (2006.01)
*H02K 9/22* (2006.01)
(Continued)

(52) U.S. Cl.
CPC ................. *H02K 5/18* (2013.01); *H02K 5/20* (2013.01); *H02K 9/06* (2013.01); *H02K 9/22* (2013.01); *H02K 5/24* (2013.01)

(58) Field of Classification Search
CPC .. H02K 5/18; H02K 9/06; H02K 5/22; H02K 5/00; H02K 5/06; H02K 5/04; H02K 11/00; F28F 2215/00; F28F 2215/10
(Continued)

(56) References Cited

U.S. PATENT DOCUMENTS 1,688,891 A * 10/1928 Spreen .................... H02K 1/185
310/51
4,103,192 A * 7/1978 Wendt ...................... H02K 5/00
165/185
(Continued)

FOREIGN PATENT DOCUMENTS

CN 103683685 A * 3/2014
CN 205051497 * 2/2016 ............... H02K 5/24
(Continued)

OTHER PUBLICATIONS

English machine translation, Liu CN 103683685 A (Year: 2014).*
English machine translation, Jin Z., CN 205051497 (Year: 2016).*
English machine translation, Li, CN 206834880 (Year: 2018).*

*Primary Examiner* — Burton S Mullins
(74) *Attorney, Agent, or Firm* — Muncy, Geissler, Olds & Lowe, PC

(57) ABSTRACT

A motor sleeve is applied to a motor housing and a motor driver housing. The motor sleeve includes a sleeve base, a second fixing structure, a second coupling structure and a plurality of base fins. The sleeve base includes an outer surface and an inner surface. The second fixing structure is disposed on the inner surface and located corresponding to a first fixing structure of the motor housing. The sleeve base is fixed to the motor housing by the first and second fixing structures. The sleeve base is installed on a side portion of the motor housing. The second coupling structure is disposed on the outer surface. The base fins are separately disposed on the outer surface and located corresponding to a first coupling structure of the motor driver housing. The motor driver housing is coupled to the sleeve base by the first and second coupling structures.

16 Claims, 8 Drawing Sheets

(51) Int. Cl.
  *H02K 11/30* (2016.01)
  *H02K 9/06* (2006.01)
  *H02K 5/20* (2006.01)
  *H02K 5/24* (2006.01)

(58) Field of Classification Search
  USPC .............................................. 310/51, 89, 91
  See application file for complete search history.

(56) References Cited

U.S. PATENT DOCUMENTS

| | | | | |
|---|---|---|---|---|
| 4,105,905 A * | 8/1978 | Barcus | ...................... | H02K 5/18 310/59 |
| 4,213,498 A | 7/1980 | Vandenbossche | | |
| 4,244,098 A * | 1/1981 | Barcus | ...................... | F28F 1/20 165/183 |
| 4,415,824 A * | 11/1983 | Meier | ...................... | F16B 4/004 29/596 |
| 4,465,946 A * | 8/1984 | Springer | .................. | H02K 5/18 310/426 |
| 4,839,547 A * | 6/1989 | Lordo | ...................... | H02K 5/18 310/60 A |
| 5,331,239 A * | 7/1994 | Kwun | .................... | H02K 17/30 310/68 R |
| 5,397,950 A * | 3/1995 | Norbury, Jr. | ........... | H02K 1/187 310/51 |
| 5,585,681 A * | 12/1996 | Bitsche | .................. | B60K 1/00 310/54 |
| 5,630,461 A * | 5/1997 | CoChimin | .............. | B22C 9/046 164/34 |
| 6,145,585 A * | 11/2000 | Wei | ......................... | H02K 5/18 165/183 |
| 6,422,527 B1 * | 7/2002 | Lees | ......................... | F16M 7/00 248/672 |
| 6,435,836 B1 * | 8/2002 | Kobayashi | .......... | F04D 15/0209 417/12 |
| 6,437,469 B1 * | 8/2002 | Davis | ...................... | H02K 5/18 310/40 R |
| 6,501,653 B1 | 12/2002 | Landsgestell | | |
| 6,657,331 B2 | 12/2003 | Asao | | |
| 6,731,028 B2 | 5/2004 | Derleth | | |
| 7,105,959 B2 | 9/2006 | Yamamoto | | |
| 7,781,926 B2 * | 8/2010 | Schmidt | ................... | H02K 5/06 310/77 |
| 7,923,875 B2 * | 4/2011 | Henry | ..................... | H02K 5/225 310/64 |
| 7,977,832 B2 * | 7/2011 | Vadillo | .................... | H02K 9/14 310/58 |
| 8,584,595 B2 * | 11/2013 | Koyama | ............... | F04D 25/105 105/133 |
| 8,912,698 B2 * | 12/2014 | Fleming | .................. | H02K 9/06 310/89 |
| 8,931,528 B2 * | 1/2015 | Hsiung | ................... | B27B 25/10 144/242.1 |
| 9,000,631 B2 * | 4/2015 | Prix | ........................ | H02K 5/20 310/54 |
| 9,407,124 B2 * | 8/2016 | Minari | ..................... | H02K 5/22 |
| 9,843,236 B2 * | 12/2017 | Cezario | .................... | F28F 3/02 |
| 2003/0006024 A1 * | 1/2003 | Wang | ....................... | H02K 5/18 165/80.3 |
| 2009/0071624 A1 * | 3/2009 | Zhang | ..................... | F21V 29/76 165/80.3 |
| 2015/0076942 A1 * | 3/2015 | Madsen Obel | .......... | H02K 9/06 310/59 |
| 2017/0025928 A1 * | 1/2017 | Luise | ....................... | H02K 5/18 |
| 2019/0190342 A1 * | 6/2019 | Wang | ....................... | H02K 5/18 |

FOREIGN PATENT DOCUMENTS

| | | | | |
|---|---|---|---|---|
| CN | 205509791 U | | 8/2016 | |
| CN | 206490525 U | | 9/2017 | |
| CN | 206834880 | * | 1/2018 | .............. H02K 5/04 |
| CN | 206834880 U | | 1/2018 | |
| CN | 207117387 U | | 3/2018 | |
| CN | 207426864 U | | 5/2018 | |
| CN | 207442576 U | | 6/2018 | |
| EP | 0048213 A1 | * | 3/1982 | .............. H02K 5/18 |
| GB | 1248957 | * | 10/1971 | .............. H02K 5/06 |
| JP | 58127541 A | * | 7/1983 | .............. H02K 5/18 |
| JP | 2005094949 A | * | 4/2005 | .............. H02K 9/02 |
| TW | 200824233 A | | 6/2008 | |
| TW | M321825 U | | 7/2009 | |
| TW | M548929 U | | 9/2017 | |
| WO | WO 00/24111 | | 4/2000 | |
| WO | WO 00/60609 | | 10/2000 | |
| WO | WO 2015181868 A1 | * | 12/2015 | .............. H02H 7/085 |
| WO | WO 2016096042 A1 | * | 6/2016 | .............. H02K 5/18 |

\* cited by examiner

MOTOR SLEEVE AND MOTOR DEVICE

CROSS REFERENCE TO RELATED APPLICATIONS

This Non-provisional application claims priority under 35 U.S.C. § 119(a) on Patent Application No(s). 107121568 filed in Taiwan, Republic of China on Jun. 22, 2018, the entire contents of which are hereby incorporated by reference.

BACKGROUND

Technology Field

The present disclosure relates to a motor and a sleeve thereof and, in particular, to an integrated motor drive and a sleeve thereof.

Description of Related Art

The integrated motor drive (IMD) device mainly includes a motor and a motor driver. The motor driver can drive the motor to rotate. In general, the motor driver is an inverter. Moreover, the motor driver further includes a controller for controlling the rotation speed of the motor.

For example, in the integrated motor drive device, the motor and the inverter are assembled and integrated together. This configuration has the advantages of saving power and space. Thus, the expansive connecting wires between the motor and the inverter can be reduced, and the external connection and layout can be also minimized. This integration design can decrease the required space for the integrated motor drive device, and the decreased layout can also make the circuit design much simpler.

However, in the integration design, the vibration of the motor can be easily transferred to the inverter, which may cause the damage of the inverter. In addition, the heat generated by the operating motor can also be transferred to the inverter, which can reduce the lifetime of the inverter.

Therefore, it is an importance subject to provide an integrated motor drive and a sleeve thereof that can speed up the heat dissipation and reduce the vibration transmission.

SUMMARY

In view of the foregoing, this disclosure provides a motor sleeve and a motor device that can speed the heat dissipation and reduce the vibration transmission.

A motor sleeve is applied to a motor housing and a motor driver housing. A first fixing structure is disposed on a side portion of the motor housing, and the motor driver housing comprises a first coupling structure. The motor sleeve comprises a sleeve base, a second fixing structure, a second coupling structure and a plurality of base fins. The sleeve base comprises an outer surface and an inner surface opposite to the outer surface. The second fixing structure is disposed on the inner surface and located corresponding to the first fixing structure of the motor housing. The sleeve base is fixed to the motor housing by the first fixing structure and the second fixing structure. The sleeve base is installed on the side portion of the motor housing. The second coupling structure is disposed on the outer surface. The base fins are separately disposed on the outer surface and located corresponding to the first coupling structure of the motor driver housing. The motor driver housing is coupled to the sleeve base by the first coupling structure and the second coupling structure.

In one embodiment, the sleeve base further comprises a first branched fin and a second branched fin. The first branched fin extends horizontally from a first fin end portion of the base fins. The second branched fin extends horizontally from a second fin end portion of the base fins.

In one embodiment, the first branched fin and the second branched fin are thermal coupled to the motor driver housing.

In one embodiment, the sleeve base comprises at least a fixing end for installing a fan.

In one embodiment, the motor sleeve further comprises a sleeve chassis, a plurality of chassis fins, and a third fixing structure. The sleeve chassis comprises an outer chassis surface and an inner chassis surface opposite to the outer chassis surface. The chassis fins are separately disposed on the outer chassis surface. The third fixing structure is disposed on the inner chassis surface and located corresponding to a fourth fixing structure of the motor housing. The sleeve chassis is fixed to the motor housing by the third fixing structure and the fourth fixing structure. The sleeve base and the sleeve chassis are coupled to form the motor sleeve.

In one embodiment, the sleeve chassis comprises at least a fixing end for installing a fan.

A motor device comprises a motor, a motor driver and a motor sleeve. The motor comprises a motor housing, and a first fixing structure is disposed on a side portion of the motor housing. The motor driver comprises a motor driver housing, and the motor driver housing comprises a first coupling structure. The motor sleeve comprises a sleeve base, a second fixing structure, a second coupling structure and a plurality of base fins. The sleeve base comprises an outer surface and an inner surface opposite to the outer surface. The second fixing structure is disposed on the inner surface and located corresponding to the first fixing structure of the motor housing. The sleeve base is fixed to the motor housing by the first fixing structure and the second fixing structure, and the sleeve base is installed on the side portion of the motor housing. The second coupling structure is disposed on the outer surface. The base fins are separately disposed on the outer surface and located corresponding to the first coupling structure of the motor driver housing. The motor driver housing is coupled to the sleeve base by the first coupling structure and the second coupling structure.

In one embodiment, the motor housing further comprises a plurality of heat dissipation plates extending from an outer wall of the motor housing and separately arranged with a predetermined interval so as to form a plurality of gaps.

In one embodiment, the second fixing structure comprises a plurality of recesses corresponding to a shape of the heat dissipation plates and thermal coupling to the heat dissipation plates.

In one embodiment, a bottom portion of the motor driver housing comprises at least a protrusion, and the protrusion forms a heat exchange portion and is accommodated in at least a gap between the base fins.

In one embodiment, the sleeve base further comprises a first branched fin and a second branched fin. The first branched fin extends horizontally from a first fin end portion of the base fins. The second branched fin extends horizontally from a second fin end portion of the base fins.

In one embodiment, the first branched fin and the second branched fin are thermal coupled to the motor driver housing.

In one embodiment, the sleeve base comprises at least a fixing end for installing a fan.

In one embodiment, the motor sleeve further comprises a sleeve chassis, a plurality of chassis fins, and a third fixing structure. The sleeve chassis comprises an outer chassis surface and an inner chassis surface opposite to the outer chassis surface. The chassis fins are separately disposed on the outer chassis surface. The third fixing structure is disposed on the inner chassis surface and located corresponding to a fourth fixing structure of the motor housing. The sleeve chassis is fixed to the motor housing by the third fixing structure and the fourth fixing structure. The sleeve base and the sleeve chassis are coupled to form the motor sleeve.

In one embodiment, the sleeve chassis comprises at least a fixing end for installing a fan.

In one embodiment, the motor device further comprises a fan installed on an end portion of the motor housing and an end portion of the sleeve base.

In one embodiment, wherein an air output surface of the fan is located away from the end portion of the motor housing and the end portion of the sleeve base.

A detachable motor heat dissipation sleeve comprises a base, a chassis, at least a damping material, and a plurality of fins. The base comprises an outer surface and an inner surface opposite to the outer surface. The chassis comprises an outer chassis surface and an inner chassis surface opposite to the outer chassis surface. The damping material is coupled to the inner surface or the inner chassis surface. The fins are separately disposed on the outer surface and the outer chassis surface. The base and the chassis are connected to form a heat dissipation sleeve.

A detachable motor heat dissipation sleeve is applied to a motor housing and comprises a base, a plurality of fins, and a plurality of fixing structures. The base comprises an outer surface and an inner surface opposite to the outer surface. The fins are separately disposed on the outer surface. The fixing structures are separately disposed on the inner surface for installing the base on the outer surface of the motor housing. The base can transfer the heat from the motor housing to the fins.

As mentioned above, the motor sleeve of this disclosure has an inner surface assembled with the motor and an outer surface assembled with the motor driver, so that the motor device can be quickly assembled. In addition, the motor sleeve has a plurality of fins for speeding the heat conducting and dissipating. Compared with the conventional integrated motor drive, which fixes the motor driver on the motor by screws or slide rails, the motor sleeve of this disclosure is provided between the motor and the motor driver for connecting the motor and the motor driver. Accordingly, this disclosure can reduce the vibration transferred from the motor to the motor driver, and rapidly assemble the motor and the motor driver. In some embodiments, the motor sleeve is a cylindrical heat dissipation sleeve, which can mount on and extend from the heat dissipating plates of the motor so as to increase the heat transmission effect of the assembled motor driver and motor. Moreover, the additional detachable fan can be further provided to achieve the rapid heat dissipation effect of the motor and the motor driver.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1A:
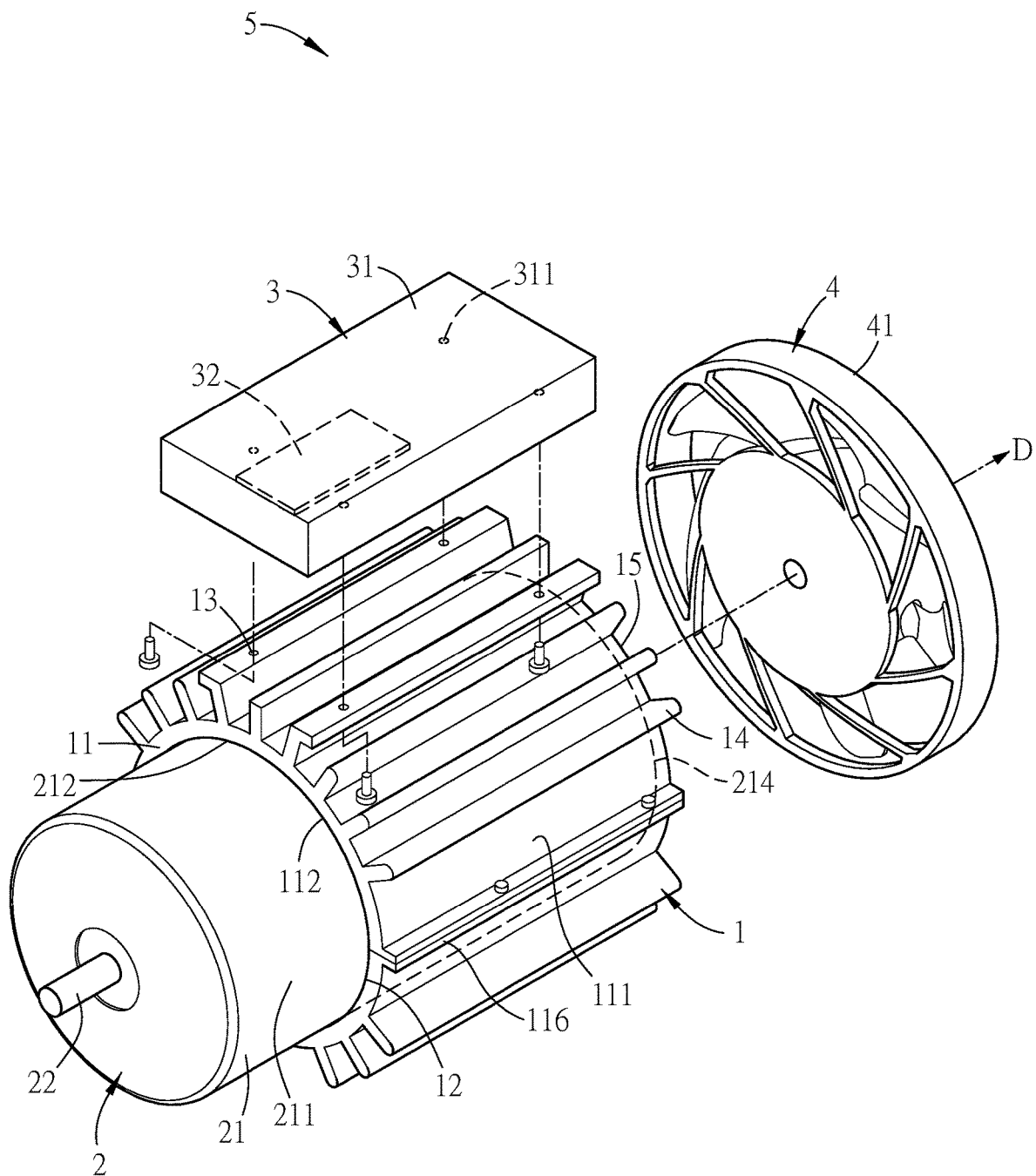
FIG. 1A is a schematic diagram showing a motor device of an embodiment.

FIG. 1A is a schematic diagram showing a motor device 5 according to an embodiment of this disclosure. Referring to FIG. 1A, a motor device 5 comprises a motor 2, a motor driver 3 and a motor sleeve 1. The motor device 5 is, for example, an integrated motor drive (IMD) device. The motor sleeve 1 is provided to integrate the motor 2 and the motor driver 3. The motor driver 3 can be designed based on the connected motor 2 for achieving the maximum performance of the motor 2 and sufficiently reducing the required wires between the conventional motor, sensing devices, driver and control system.

The motor 2 comprises a motor housing 21 and a shaft 22. The shaft 22 protrudes from one end of the motor housing 21 and extends outwardly. The shaft 22 can connect to an object and drive the object to rotate. The internal components of the motor 2 are disposed inside the motor housing 21. The internal components include, for example, a rotor and a stator. The shaft 22 is installed on the rotor, and the rotor can drive the shaft 22 to rotate.

The motor driver 3 includes a motor driver housing 31 and a driver circuit 32. The driver circuit 32 is disposed inside the motor driver housing 31 and electrically connecting to the motor 2 for driving the motor 2 to rotate. For example, the driver circuit 32 includes a plurality of power transistors. The driver circuit 32 can be formed on a circuit board, and the circuit board can be installed inside the motor driver housing 31. In addition, based on the type of the motor 2, the driver circuit 32 can be an inverter or a converter.

In addition, the driver circuit 32 can electrically connect to an external control system for controlling the rotation speed of the motor 2. For example, the external control system may output a control signal to the driver circuit 32. Alternatively, the driver circuit 32 may include a controller, which can output a control signal to the driver of the driver circuit 32, and the driver can drive the motor 2 to rotate. The driver can be, for example, an inverter or a converter. The control signal can control the current, voltage, or frequency outputted from the driver circuit 32 to the motor 2, thereby controlling the rotation speed of the motor 2. The control signal can be, for example, a PWM signal or a digital signal, which may carry an instruction.

Figure 1B:
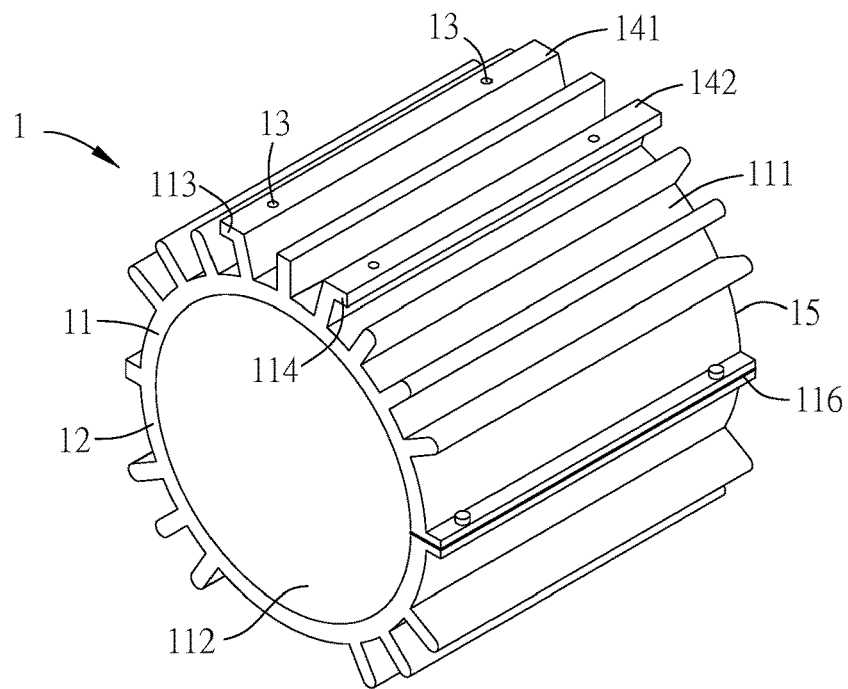
FIG. 1B is a schematic diagram of a motor sleeve of FIG. 1A.
Figure 1C:
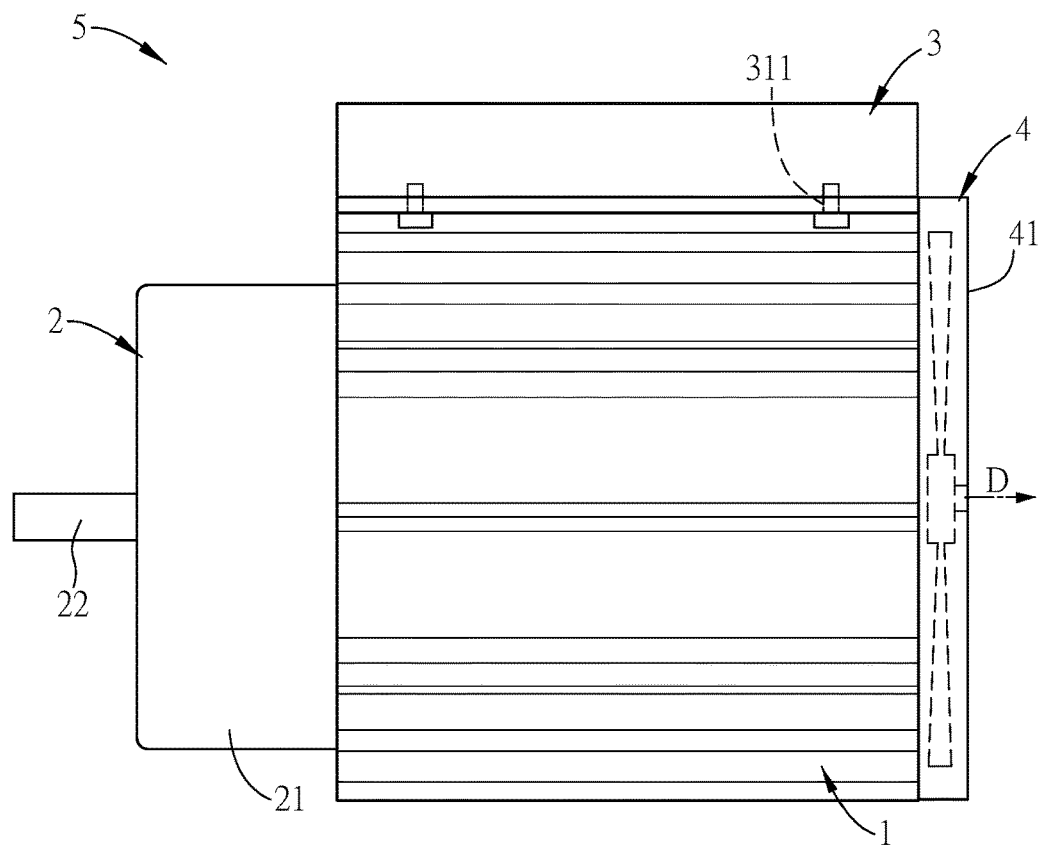
FIG. 1C is a front view of the motor device of FIG. 1A.

FIG. 1B is a schematic diagram of a motor sleeve 1 of FIG. 1A, and FIG. 1C is a front view of the motor device 5 of FIG. 1A. Referring to FIGS. 1A to 1C, a first fixing structure 212 is disposed on a side portion 211 of the motor housing 21, and the motor driver housing 31 comprises a first coupling structure 311. The motor sleeve 1 comprises a sleeve base 11, a second fixing structure 12, a second coupling structure 13, and a plurality of base fins 14. The sleeve base 11 comprises an outer surface 111 and an inner surface 112 opposite to the outer surface 111. The second fixing structure 12 is disposed on the inner surface 112 and located corresponding to the first fixing structure 212 of the motor housing 21. The sleeve base 11 is fixed to the motor housing 21 by the first fixing structure 212 and the second fixing structure 12. The sleeve base 11 is installed on the side portion 211 of the motor housing 21. The second coupling structure 13 is disposed on the outer surface 111. The base fins 14 are separately disposed on the outer surface 111. The second coupling structure 13 is located corresponding to the first coupling structure 311 of the motor driver housing 31. The motor driver housing 31 is coupled to the sleeve base 11 by the first coupling structure 311 and the second coupling structure 13.

The inner surface 112 of the motor sleeve 1 is assembled with the motor 2, so that the heat generated by the operating motor 2 will be transferred to the motor housing 21 and then reach the motor sleeve 1. The outer surface 111 of the motor sleeve 1 is connected to the motor driver 3. In the motor driver 3, the driver circuit 32 also generates heat during the operation, and the generated heat will be transferred to the motor driver housing 31 and then reach the motor sleeve 1. After reaching the motor sleeve 1, the heat can be dissipated by the base fins 14 of the motor sleeve 1. This configuration can speed the heat dissipation rate and simultaneously dissipate the heat of the motor 2 and the motor driver 3 by a single motor sleeve 1.

The motor sleeve 1 is disposed between the motor 2 and the motor driver 3. In this embodiment, the motor driver 3 is not directly fixed on the motor 2 by screws or slide rails. Accordingly, the disclosure can reduce the vibration transferred from the motor 2 to the motor driver 3.

In this embodiment, the outer surface of the motor housing 21 is shaped as the first fixing structure 212, and the inner surface 111 of the sleeve base 11 is directly shaped as the second fixing structure 12. The shape of the first fixing structure 212 matches the shape of the second fixing structure 12, so that the motor sleeve 1 can be tightly mounted on the motor housing 21. For example, the motor sleeve 1 is a cylindrical heat dissipation sleeve, and the motor housing 21 has a cylinder shape. Therefore, the motor sleeve 1 can mount on the motor 2. The annularly extending heat dissipation plates can rapidly conduct and dissipate the heat of the rotor and stator of the motor 2. Since the motor 2 does not have any heat dissipation plates, the motor sleeve 1 can mount on and be fixed to the motor 2 (by screwing).

In addition, the first coupling structure 311 and the second coupling structure 13 are connected by screws or rivets. In this case, the first coupling structure 311 and the second coupling structure 13 are holes. The amount of the first coupling structure 311 can be one or more, and amount of the second coupling structure 13 can also be one or more. For example, this embodiment may configure four first coupling structures 311 and four second coupling structures 13.

Moreover, the motor device further comprises a fan 4 installed on an end portion 214 of the motor housing 21 and an end portion 15 of the sleeve base 11. An air output surface 41 of the fan 4 is located away from the end portion 214 of the motor housing 21 and the end portion 15 of the sleeve base 11. The fan 4 blows toward a direction D. The configuration of the additional detachable fan 4 can rapidly and simultaneously dissipate the heat of the motor 2 and the motor driver 3, which are integrated.

Furthermore, the sleeve base 11 further comprises a first branched fin 113 and a second branched fin 114. The first branched fin 113 extends horizontally from a first fin end portion 141 of the base fins 14. The second branched fin 114 extends horizontally from a second fin end portion 142 of the base fins 14.

The first branched fin 113 and the second branched fin 114 are thermal coupled to the motor driver housing 31. For example, the first branched fin 113 and the second branched fin 114 can be directly or indirectly connected to the motor driver housing 31, and they can be thermal coupled so that the heat can be conducted therebetween. In the indirectly connection case, another thermal conductive element is provided to connect the first branched fin 113 with the motor driver housing 31 and to connect the second branched fin 114 with the motor driver housing 31.

Figure 2:
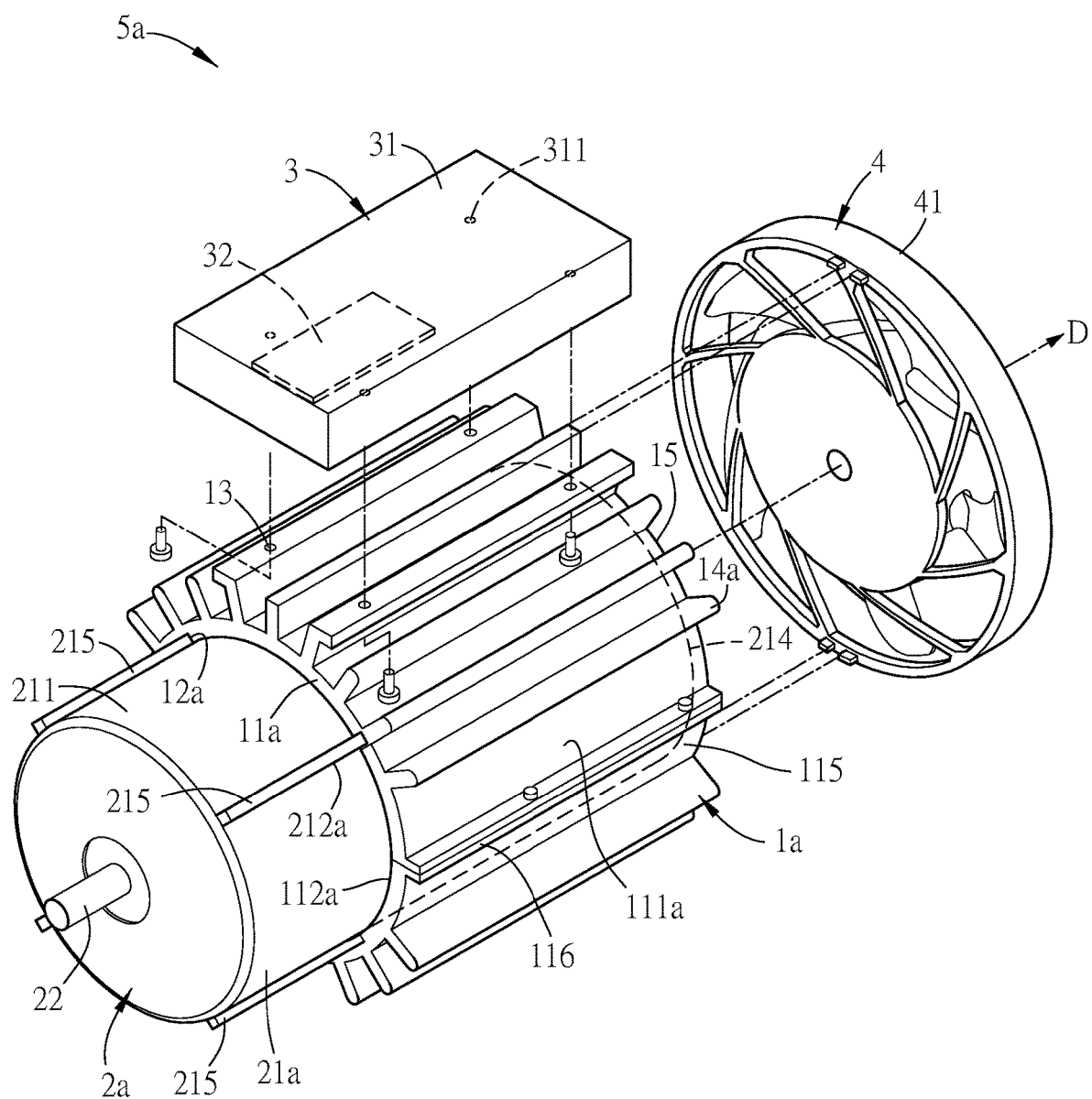
FIG. 2 is a schematic diagram showing a motor device of an embodiment.

FIG. 2 is a schematic diagram showing a motor device 5a of an embodiment. As shown in FIG. 2, the motor housing 21a of the motor device 5a further comprises a plurality of heat dissipation plates 215 extending from an outer wall of the motor housing 21a and separately arranged with a predetermined interval so as to form a plurality of gaps. The positions of the gaps can be designed based on the heat source(s) of the motor so as to precisely dissipate the generated heat and reduce the loss of the heat dissipation material.

In this embodiment, the heat dissipation plates 215 can be directly used as the first fixing structures 212a, and the second fixing structure 12a of the motor sleeve 1a comprises a plurality of recesses. The recesses can be designed corresponding to the shape of the heat dissipation plates 215, so that the recesses and the heat dissipation plates 215 can be thermal coupled with each other. For example, the recesses are disposed at the inner side of the sleeve base 11a, and the second fixing structures 12a can be inserted into the recesses and directly or indirectly contact the heat dissipation plates 215. Thus, they can be thermal coupled so that the heat can be conducted therebetween. In the indirectly connection case, another thermal conductive element is provided between the second fixing structures 12a and the heat dissipation plates 215. The amount of the first fixing structures 212a can be one or more, and amount of the second fixing structures 12a can also be one or more. For example, this embodiment may configure four first fixing structures 212a and four second fixing structures 12a.

The cylindrical motor sleeve 1a is mounted and fixed on the heat dissipation plates 215 of the motor 2a, so that the motor sleeve 1a can be an extension structure of the heat dissipation plates 215. The motor sleeve 1a can be attached to the surface of the motor 2a and form a larger thermal conductive surface for achieving the effect of rapidly heat transmission. The motor driver housing 31 can also be designed as a thermal conductive element. The combination of the motor driver housing 31 and the cylindrical motor sleeve 1a can provide the rapid heat transmission for the driver components. The fan 4 can be additionally and detachably disposed on the cylindrical motor sleeve 1a. The configuration of the additional detachable fan 4 can rapidly and simultaneously dissipate the heat of the motor 2a and the motor driver 3 by a single motor sleeve 1a.

For example, as shown in FIGS. 1A and 2, the sleeve base 11 or 11a can be a single sheet. The single sheet is curved, and the two ends of the curved sheet are connected at the fixing positions 116, thereby forming a sleeve shape. The two ends of the curved sheet can be connected by screwing, engaging or hooking. In addition, the sleeve base 11 or 11a can also be formed by another process, such as pressing or casting.

As shown in FIG. 2, the sleeve base 11a comprises at least one fixing end 115 for installing the fan 4. The fan 4 can be installed by embedding. In more details, the fan 4 has a protrusion for embedding into the fixing end 115. In other aspects, the fans 4 can be screwed on the sleeve base 11. The sleeve base 11 and the fan 4 as shown in FIG. 1A can also be assembled as the way shown in FIG. 2.

As shown in FIGS. 1A and 2, the fan 4 is an axial-flow fan. Of course, the fan 4 can also be a side channel blower or a centrifugal fan. When the fan 4 is an axial-flow fan, the blades of the fan 4 are disposed corresponding to the integrated structural design of the motor 2 or 2a and the motor driver 3 for providing the effect of simultaneous and rapid heat dissipation.

Referring to FIG. 2, regarding the motor sleeve 1a and the motor housing 21a, the motor sleeve 1a is a detachable motor heat dissipation sleeve, which can be additionally mounted on the motor housing 21a. The motor sleeve 1a comprises a base 11a (referring to the sleeve base 11a), a plurality of fins 14a (referring to the base fins 14a), and a plurality of fixing structures 12a (referring to the second fixing structure 12a). The base 11a comprises an outer surface 111a and an inner surface 112a opposite to the outer surface 111a. The fins 14a are separately disposed on the outer surface 111a. The fixing structures 12a are separately disposed on the inner surface 112a for installing the base 11a on the outer surface of the motor housing 21a. The base 11a can transfer the heat from the motor housing 21a to the fins 14a.

In some modified aspects, the motor sleeve may not comprise a single sleeve base but further comprise other components (e.g. a sleeve chassis). These modified aspects will be described hereinafter with reference to the following drawings.

Figure 3A:
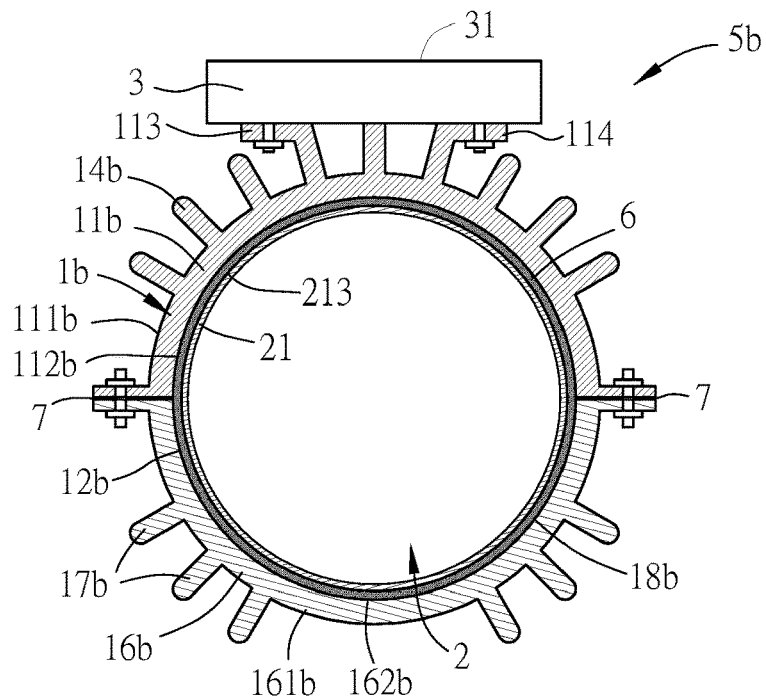
FIGS. 3A to 3C are side views of different aspects of the motor device.
Figure 3B:
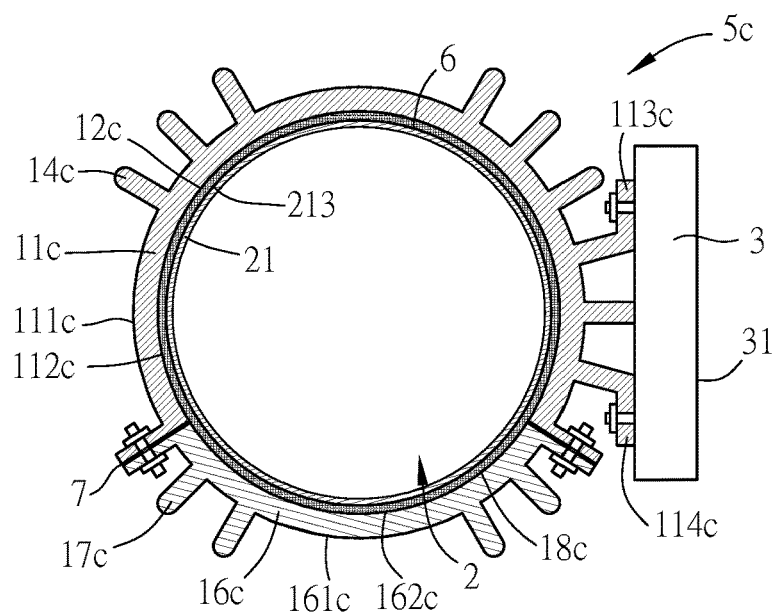
Figure 3C:
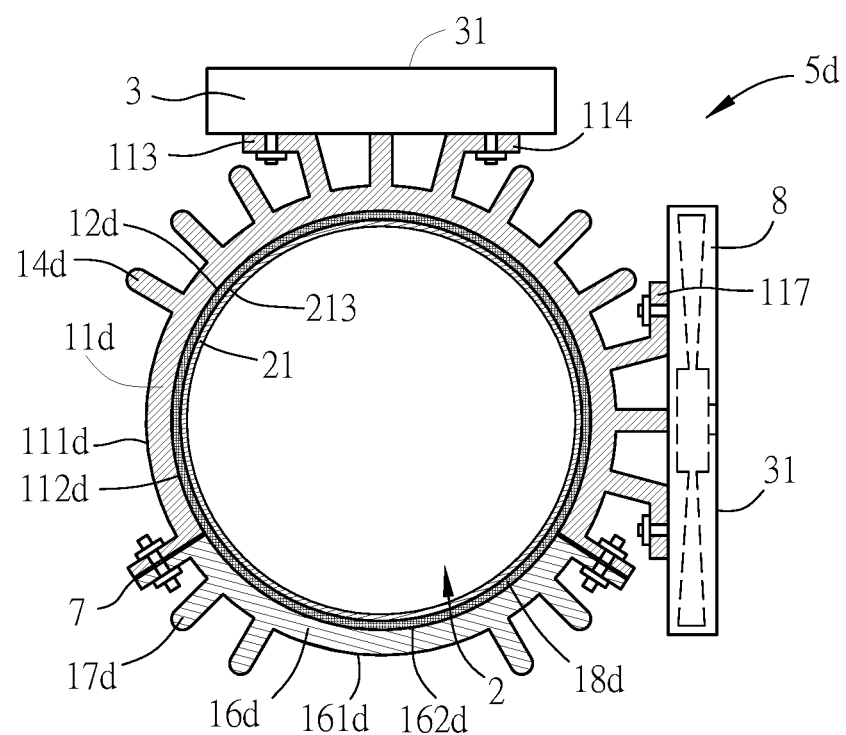

FIGS. 3A to 3C are side views of different aspects of the motor device. In the motor device 5b of FIG. 3A, the motor sleeve 1b further comprises a sleeve chassis 16b, a plurality of chassis fins 17b, and a third fixing structure 18b. The sleeve base 11b is coupled to the sleeve chassis 16b to form the body of the motor sleeve 1b. For example, an elastic washer 7 is disposed between the sleeve base 11b and the sleeve chassis 16b, and a screw is provided to screw and fix the sleeve base 11b and the sleeve chassis 16b. The configuration of the elastic washer 7 can reduce the vibration transmission from the motor 2, thereby inhibiting the motor vibration and decreasing the vibration transferred from the motor to the motor driver.

The sleeve chassis 16b comprises an outer chassis surface 161b and an inner chassis surface 162b opposite to the outer chassis surface 161b. The chassis fins 17b are separately disposed on the outer chassis surface 161b. The third fixing structure 18b is disposed on the inner chassis surface 162b and located corresponding to a fourth fixing structure 213 of the motor housing 21. The sleeve chassis 16b is fixed to the motor housing 21 by the third fixing structure 18b and the fourth fixing structure 213.

In this embodiment, the outer surface of the motor housing 21 is shaped as the fourth fixing structure 213, and the inner chassis surface 162b of the sleeve chassis 16b is directly shaped as the third fixing structure 18b. The shape of the fourth fixing structure 213 matches the shape of the third fixing structure 18b, so that the motor sleeve 1b can be tightly mounted on the motor housing 21.

The motor sleeve 1b further comprises at least one damping material 6, which is coupled to the inner surface 112b or the inner chassis surface 162b. The damping material 6 is disposed between the motor housing 21 and the motor sleeve 1b for decreasing the vibration transmission of the motor 2.

The motor sleeves 1c-1d of FIGS. 3B and 3C have the same or similar configurations as the motor sleeve 1b of FIG. 3A. The components shown in FIGS. 3B and 3C having the same digits or the same digits with different alphabets can be referred to the corresponding components of FIG. 3A, and the detailed descriptions thereof will be omitted.

As shown in FIG. 3A, each of the sleeve base 11b and the sleeve chassis 16b has a semicircular shape, and the first branched fin 113 and the second branched fin 114 are disposed at the opposite positions of the circle of the sleeve base 11b. As shown in FIG. 3B, the sleeve base 11c has a larger arc shape than the sleeve chassis 16c, and the first branched fin 113c and the second branched fin 114c are disposed at the lower part of the sleeve base 11c. For example, as shown in FIG. 3B, the sleeve chassis 16c can stand on the ground, the surface of another object, or a horizontal plane, and the motor driver 3 can be installed at the lateral side of the motor device 5c instead of the top thereof.

As shown in FIG. 3C, the sleeve base 11d further comprises a branched fin 117, which extends similar to the first branched fin 113. A fan 8 is installed on the branched fin 117 for enhancing the heat dissipation efficiency.

As shown in FIG. 3A, the motor sleeve 1b is a detachable motor heat dissipation sleeve, and the motor sleeve 1b comprises a base 11b (referring to the sleeve base 11b), a chassis 16b (referring to the sleeve chassis 16b), at least a damping material 6, and a plurality of fins 14b and 17b (referring to the base fins 14b and the chassis fins 17b). The base 11b comprises an outer surface 111b and an inner surface 112b opposite to the outer surface 111b. The chassis 16b comprises an outer chassis surface 161b and an inner chassis surface 162b opposite to the outer chassis surface 161b. The damping material 6 is coupled to the inner surface 112b or the inner chassis surface 162b. The fins 14b and 17b are separately disposed on the outer surface 111b and the outer chassis surface 161b. The base 11b and the chassis 16b are connected to form a heat dissipation sleeve. The motor sleeves 1c~1d of FIGS. 3B and 3C have the same or similar configurations as the motor sleeve 1b of FIG. 3A. The components shown in FIGS. 3B and 3C having the same digits or the same digits with different alphabets can be referred to the corresponding components of FIG. 3A, and the detailed descriptions thereof will be omitted.

Figure 4A:
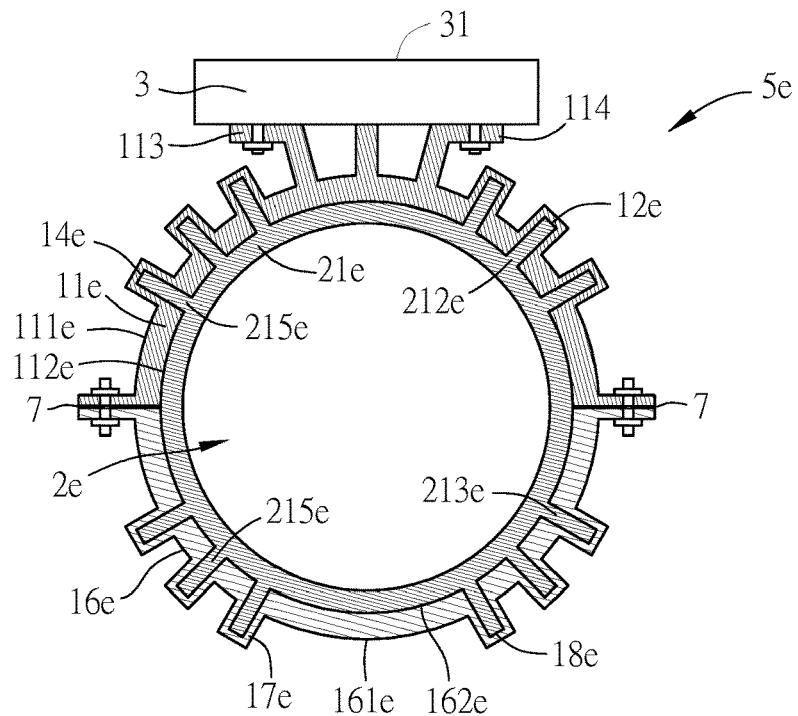
FIGS. 4A and 4B are side views of different aspects of the motor device.
Figure 4B:
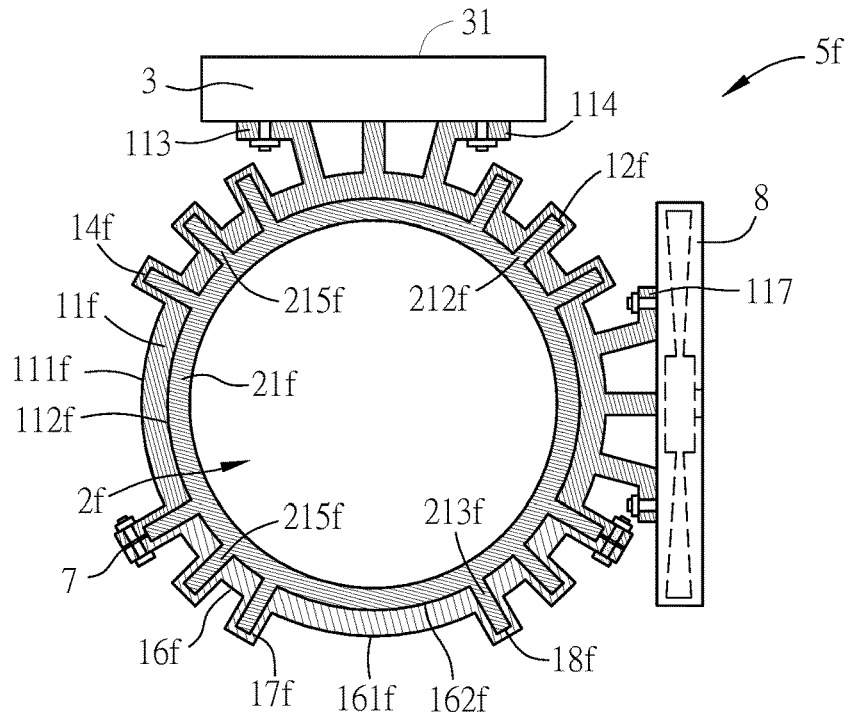

FIGS. 4A and 4B are side views of different aspects of the motor device. In the motor device 5e of FIG. 4A, the heat dissipation plates 215e of the motor 2e can be used as the first fixing structure 212e and the fourth fixing structure 213e. The second fixing structure 12e of the base 11e and the third fixing structure 18e of the chassis 16e comprise a plurality of recesses. The shape of the recesses correspond to the heat dissipation plates 215e, and the recesses are thermal coupled with the heat dissipation plates 215e. For example, the recesses of the second fixing structure 12e and the third fixing structure 18e can directly or indirectly contact the heat dissipation plates 215e. Thus, they can be thermal coupled so that the heat can be conducted therebetween. In the indirectly connection case, another thermal conductive element is provided between the second fixing structures 12e and the heat dissipation plates 215e. The amount of the fixing structures can be one or more, and this disclosure is not limited. In addition, the second fixing structure 12e and the third fixing structure 18e are located corresponding to the base fins 14e and the chassis fins 17e, respectively, and the fixing structures are disposed at the roots of the corresponding fins. The motor sleeve 1f of FIG. 4B has the same or similar configurations as the motor sleeve 1e of FIG. 4A. The components shown in FIG. 4B having the same digits or the same digits with different alphabets can be referred to the corresponding components of FIG. 4A, and the detailed descriptions thereof will be omitted.

As shown in FIG. 4A, in another aspect, the motor sleeve 1e is a detachable motor heat dissipation sleeve, and the motor sleeve 1e comprises a base 11e (referring to the sleeve base 11e), a chassis 16e (referring to the sleeve chassis 16e), and a plurality of fins 14e and 17e (referring to the base fins 14e and the chassis fins 17e). The base 11e comprises an outer surface 111e and an inner surface 112e opposite to the outer surface 111e. The chassis 16e comprises an outer chassis surface 161e and an inner chassis surface 162e opposite to the outer chassis surface 161e. The fins 14e and 17e are separately disposed on the outer surface 111e and the outer chassis surface 161e. The base 11e and the chassis 16e are connected to form a heat dissipation sleeve. In addition, the motor sleeve 1e may further comprise at least a damping material, which is coupled to the inner surface 112e or the inner chassis surface 162e. The configuration of the damping material can be referred to the damping material 6 as shown in FIGS. 3A to 3C. The motor sleeve 1f of FIG. 4B has the same or similar configurations as the motor sleeve 1e of FIG. 4A. The components shown in FIG. 4B having the same digits or the same digits with different alphabets can be referred to the corresponding components of FIG. 4A, and the detailed descriptions thereof will be omitted.

As shown in FIG. 4A, in another aspect, regarding the motor sleeve 1e and the motor housing 21e, the motor sleeve 1e is a detachable motor heat dissipation sleeve, which can be mounted on the motor housing 21e. The motor sleeve 1e comprises a base 11e (referring to the sleeve base 11e), a plurality of fins 14e (referring to the base fins 14e), and a plurality of fixing structures 12e (referring to the second fixing structures 12e of the base 11e). The base 11e comprises an outer surface 111e and an inner surface 112e opposite to the outer surface 111e. The fins 14e are separately disposed on the outer surface 111e. The fixing structures 12e are separately disposed on the inner surface 112e for installing the base 11e on the outer surface of the motor housing 21e. The base 11e can transfer the heat from the motor housing 21e to the fins 14e. The motor sleeve 1f of FIG. 4B has the same or similar configurations as the motor sleeve 1e of FIG. 4A. The components shown in FIG. 4B having the same digits or the same digits with different alphabets can be referred to the corresponding components of FIG. 4A, and the detailed descriptions thereof will be omitted.

Figure 5A:
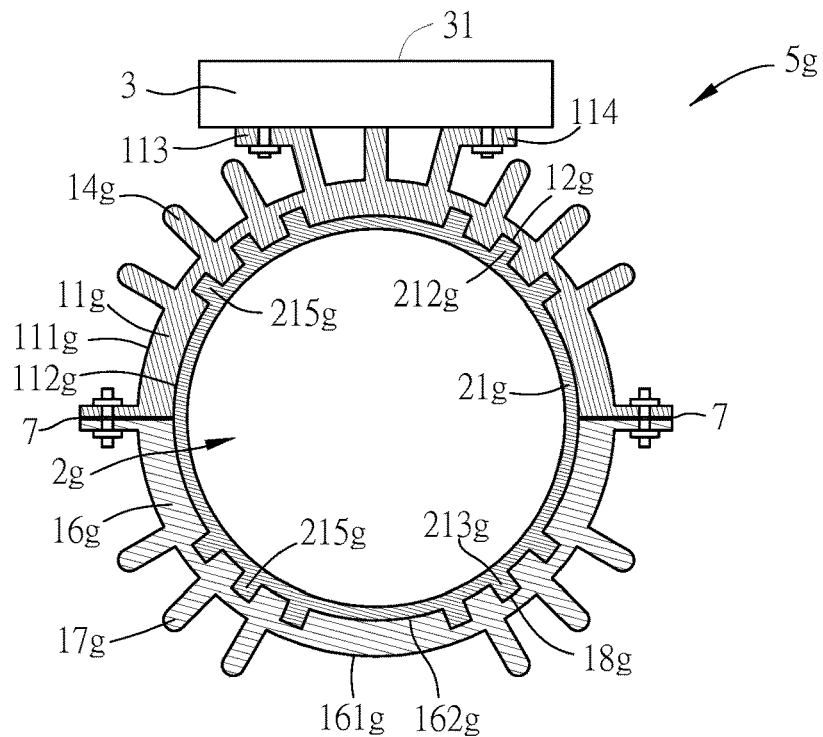
FIGS. 5A and 5B are side views of different aspects of the motor device.
Figure 5B:
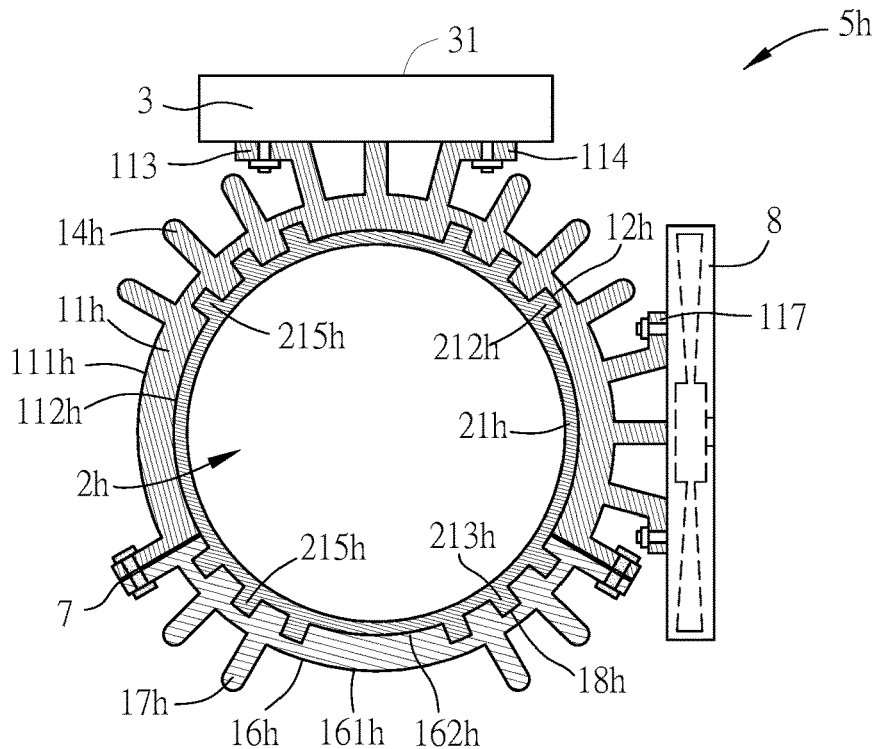

FIGS. 5A and 5B are side views of different aspects of the motor device. In the motor device 5g of FIG. 5A, the heat dissipation plates 215g of the motor 2g can be used as the first fixing structure 212g and the fourth fixing structure 213g. The second fixing structure 12g and the third fixing structure 18g comprise a plurality of recesses. The shape of the recesses correspond to the heat dissipation plates 215g, and the recesses are thermal coupled with the heat dissipation plates 215g. In addition, the second fixing structure 12g is located between the base fins 14g, and the third fixing structure 18g is located between the chassis fins 17g. The heat dissipation plates 215g do not reach the roots of the base fins 14g and the chassis fins 17g. The motor sleeve 1h of FIG. 5B has the same or similar configurations as the motor sleeve 1g of FIG. 5A. The components shown in FIG. 5B having the same digits or the same digits with different alphabets can be referred to the corresponding components of FIG. 5A, and the detailed descriptions thereof will be omitted.

As shown in FIG. 5A, in another aspect, the motor sleeve 1g is a detachable motor heat dissipation sleeve, and the motor sleeve 1g comprises a base 11g (referring to the sleeve base 11g), a chassis 16g (referring to the sleeve chassis 16g), and a plurality of fins 14g and 17g (referring to the base fins 14g and the chassis fins 17g). The base 11g comprises an outer surface 111g and an inner surface 112g opposite to the outer surface 111g. The chassis 16g comprises an outer chassis surface 161g and an inner chassis surface 162g opposite to the outer chassis surface 161g. The fins 14g and 17g are separately disposed on the outer surface 111g and the outer chassis surface 161g. The base 11g and the chassis 16g are connected to form a heat dissipation sleeve. In addition, the motor sleeve 1g may further comprise at least a damping material, which is coupled to the inner surface 112g or the inner chassis surface 162g. The configuration of the damping material can be referred to the damping material 6 as shown in FIGS. 3A to 3C. The motor sleeve 1h of FIG. 5B has the same or similar configurations as the motor sleeve 1g of FIG. 5A. The components shown in FIG. 5B having the same digits or the same digits with different alphabets can be referred to the corresponding components of FIG. 5A, and the detailed descriptions thereof will be omitted.

Figure 6A:
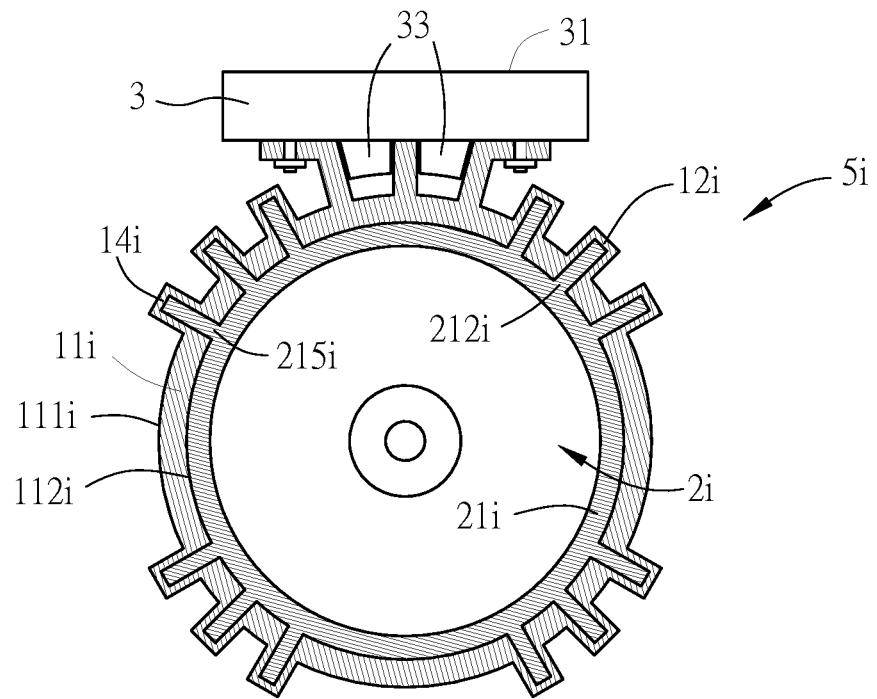
FIGS. 6A and 6B are side views of different aspects of the motor device.

As shown in FIG. 6A, in another aspect, regarding the motor sleeve 1g and the motor housing 21g, the motor sleeve 1g is a detachable motor heat dissipation sleeve, which can be mounted on the motor housing 21g. The motor sleeve 1g comprises a base 11g (referring to the sleeve base 11g), a plurality of fins 14g (referring to the base fins 14g), and a plurality of fixing structures 12g (referring to the second fixing structures 12g of the base 11g). The base 11g comprises an outer surface 111g and an inner surface 112g opposite to the outer surface 111g. The fins 14g are separately disposed on the outer surface 111g. The fixing structures 12g are separately disposed on the inner surface 112g for installing the base 11g on the outer surface of the motor housing 21g. The base 11g can transfer the heat from the motor housing 21g to the fins 14g. The motor sleeve 1h of FIG. 5B has the same or similar configurations as the motor sleeve 1g of FIG. 5A. The components shown in FIG. 5B having the same digits or the same digits with different alphabets can be referred to the corresponding components of FIG. 5A, and the detailed descriptions thereof will be omitted.

Figure 6B:
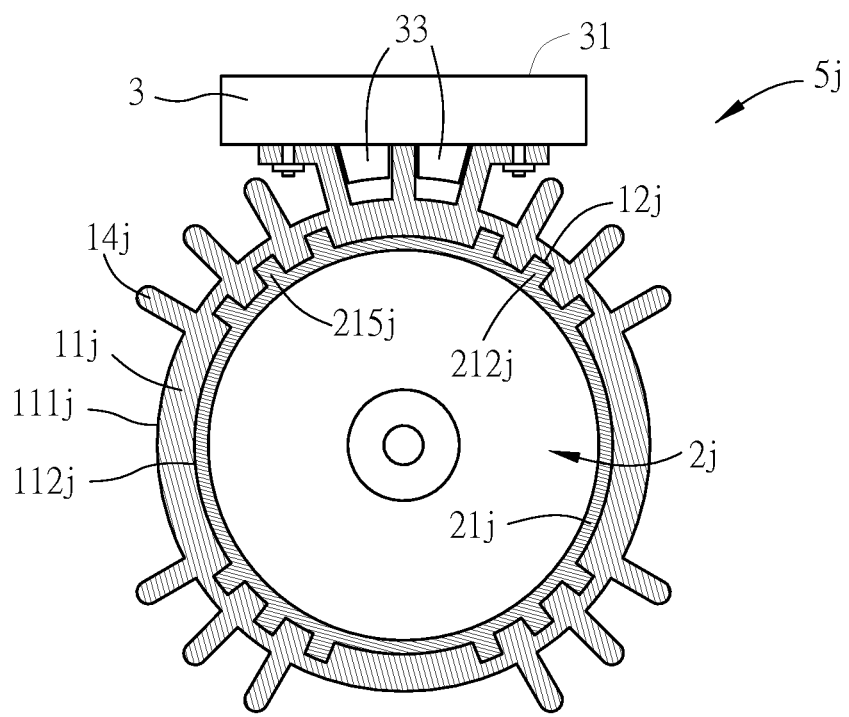

FIGS. 6A and 6B are side views of different aspects of the motor device. In the motor devices 5i and 5j of FIGS. 6A and 6B, a bottom portion of the motor driver housing 31 comprises at least a protrusion 33, and the protrusion 33 forms a heat exchange portion and is accommodated in at least a gap between the base fins 14i and 14j. To be noted, each of the bottom portions of the motor driver housings 31 of FIGS. 3A to 3C, 4A to 4B, and 5A to 5B may also be configured with a protrusion 33 similar to the configuration of the gap of FIG. 6A or 6B.

As shown in FIG. 6A, in another aspect, the motor sleeve 1i is a detachable motor heat dissipation sleeve, which can be mounted on the motor housing 21i. The motor sleeve 1i comprises a base 11i (referring to the sleeve base 11i), a plurality of fins 14i (referring to the base fins 14i), and a plurality of fixing structures 12i (referring to the second fixing structures 12*i* of the base 11*i*). The base 11*i* comprises an outer surface 111*i* and an inner surface 112*i* opposite to the outer surface 111*i*. The fins 14*i* are separately disposed on the outer surface 111*i*. The fixing structures 12*i* are separately disposed on the inner surface 112*i* for installing the base 11*i* on the outer surface of the motor housing 21*i*. The base 11*i* can transfer the heat from the motor housing 21*i* to the fins 14*i*. The motor sleeve 1*j* of FIG. 6B has the same or similar configurations as the motor sleeve 1*i* of FIG. 6A. The components shown in FIG. 6B having the same digits or the same digits with different alphabets can be referred to the corresponding components of FIG. 6A, and the detailed descriptions thereof will be omitted.

As shown in FIGS. 3A to 3C, 4A to 4B, and 5A to 5B, each of the sleeve chasses 16*b*~16*h* comprises at least one fixing end for installing the fan 4. The installation position of the fan 4 can refer to that shown in FIG. 2. As shown in FIGS. 6A and 6B, each of the sleeve bases 11*i* and 11*j* comprises at least one fixing end for installing the fan 4. The installation position of the fan 4 can refer to that shown in FIG. 2.

In the above embodiments, the branched fins of the heat dissipation plates can be used as the extension structure of the motor driver housing and the cylindrical motor sleeve, and the motor driver housing can be fixed by the locking points of the extending horizontal structure along with the elastic washer. These extension structures can be used to fix one or more fans. The added locking points, which are disposed on the extension horizontal structure, can be used to install more fans for speeding the heat dissipation rate. The cylindrical motor sleeve design can install the motor driver housing at any desired direction. Moreover, the metal slide rail can also be configured on the horizontal extension structures of the branched fins for installing or uninstalling the motor driver housing.

In summary, the motor sleeve of this disclosure has an inner surface assembled with the motor and an outer surface assembled with the motor driver, so that the motor device can be quickly assembled. In addition, the motor sleeve has a plurality of fins for speeding the heat conducting and dissipating. Compared with the conventional integrated motor drive, which fixes the motor driver on the motor by screws or slide rails, the motor sleeve of this disclosure is provided between the motor and the motor driver for connecting the motor and the motor driver. Accordingly, this disclosure can reduce the vibration transferred from the motor to the motor driver, and rapidly assemble the motor and the motor driver. In some embodiments, the motor sleeve is a cylindrical heat dissipation sleeve, which can mount on and extend from the heat dissipating plates of the motor so as to increase the heat transmission effect of the assembled motor driver and motor. Moreover, the additional detachable fan can be further provided to achieve the rapid heat dissipation effect of the motor and the motor driver.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A motor sleeve applied to a motor housing and a motor driver housing, wherein a first fixing structure is disposed on a lateral portion of the motor housing, and the motor driver housing comprises a first coupling structure, the motor sleeve comprising:

a sleeve base comprising an outer surface and an inner surface opposite to the outer surface;
a second fixing structure disposed on the inner surface and corresponding to the first fixing structure of the motor housing, wherein the sleeve base is fixed to the motor housing by the first fixing structure and the second fixing structure, and the sleeve base is installed on the lateral portion of the motor housing;
a second coupling structure disposed on the outer surface; and
a plurality of base fins separately disposed on the outer surface and corresponding to the first coupling structure of the motor driver housing, wherein the motor driver housing is coupled to the sleeve base by the first coupling structure and the second coupling structure,
wherein the sleeve base further comprises:
  a first branched fin extending horizontally at a plane from a first fin end portion of the base fins; and
  a second branched fin extending horizontally at the plane from a second fin end portion of the base fins, and
wherein an upper surface of the first branched fin and an upper surface of the second branched fin at the plane are configured for the motor driver housing being installed thereon.

2. The motor sleeve according to claim 1, wherein the first branched fin and the second branched fin are thermally coupled to the motor driver housing.

3. The motor sleeve according to claim 1, wherein the sleeve base comprises at least a fixing end for installing a fan.

4. The motor sleeve according to claim 1, further comprising:

a sleeve chassis comprising an outer chassis surface and an inner chassis surface opposite to the outer chassis surface;
a plurality of chassis fins separately disposed on the outer chassis surface; and
a third fixing structure disposed on the inner chassis surface and corresponding to a fourth fixing structure of the motor housing, wherein the sleeve chassis is fixed to the motor housing by the third fixing structure and the fourth fixing structure;
wherein the sleeve base and the sleeve chassis are coupled to form the motor sleeve.

5. The motor sleeve according to claim 4, wherein the sleeve chassis comprises at least a fixing end for installing a fan.

6. A motor device, comprising:

a motor comprising a motor housing, wherein a first fixing structure is disposed on a lateral portion of the motor housing;
a motor driver comprising a motor driver housing, wherein the motor driver housing comprises a first coupling structure; and
a motor sleeve comprising:
  a sleeve base comprising an outer surface and an inner surface opposite to the outer surface,
  a second fixing structure disposed on the inner surface and corresponding to the first fixing structure of the motor housing, wherein the sleeve base is fixed to the motor housing by the first fixing structure and the second fixing structure, and the sleeve base is installed on the lateral portion of the motor housing,
  a second coupling structure disposed on the outer surface, and a plurality of base fins separately disposed on the outer surface and corresponding to the first coupling structure of the motor driver housing, wherein the motor driver housing is coupled to the sleeve base by the first coupling structure and the second coupling structure, wherein the sleeve base further comprises:
a first branched fin extending horizontally at a plane from a first fin end portion of the base fins; and
a second branched fin extending horizontally at the plane from a second fin end portion of the base fins, and wherein an upper surface of the first branched fin and an upper surface of the second branched fin at the plane are configured for the motor driver housing being installed thereon.

7. The motor device according to claim 6, wherein the motor housing further comprises:
a plurality of heat dissipation plates extending from an outer wall of the motor housing and separately arranged with a predetermined interval so as to form a plurality of gaps.

8. The motor device according to claim 7, wherein the second fixing structure comprises:
a plurality of recesses corresponding to a shape of the heat dissipation plates and thermally coupled to the heat dissipation plates.

9. The motor device according to claim 6, wherein a bottom portion of the motor driver housing comprises at least a protrusion, and the protrusion forms a heat exchange portion and is accommodated in at least a gap between the base fins.

10. The motor device according to claim 6, wherein the first branched fin and the second branched fin are thermally coupled to the motor driver housing.

11. The motor device according to claim 6, wherein the sleeve base comprises at least a fixing end for installing a fan.

12. The motor device according to claim 6, wherein the motor sleeve further comprises:
a sleeve chassis comprising an outer chassis surface and an inner chassis surface opposite to the outer chassis surface;
a plurality of chassis fins separately disposed on the outer chassis surface; and
a third fixing structure disposed on the inner chassis surface and corresponding to a fourth fixing structure of the motor housing, wherein the sleeve chassis is fixed to the motor housing by the third fixing structure and the fourth fixing structure;
wherein the sleeve base and the sleeve chassis are coupled to form the motor sleeve.

13. The motor device according to claim 12, wherein the sleeve chassis comprises at least a fixing end for installing a fan.

14. The motor device according to claim 6, further comprising:
a fan installed on an end portion of the motor housing and an end portion of the sleeve base.

15. The motor device according to claim 14, wherein an air output surface of the fan is away from the end portion of the motor housing and the end portion of the sleeve base.

16. A detachable motor heat dissipation sleeve, comprising:
a base comprising an outer surface and an inner surface opposite to the outer surface;
a chassis comprising an outer chassis surface and an inner chassis surface opposite to the outer chassis surface;
at least a damping material coupled to the inner surface or the inner chassis surface; and
a plurality of fins separately disposed on the outer surface and the outer chassis surface;
wherein the base and the chassis are connected to form a heat dissipation sleeve;
wherein the sleeve base further comprises:
a first branched fin extending horizontally at a plane from a first fin end portion of the base fins; and
a second branched fin extending horizontally at the plane from a second fin end portion of the base fins, and
wherein an upper surface of the first branched fin and an upper surface of the second branched fin at the plane are configured for a motor driver housing being installed thereon.

* * * * *